United States Patent [19]

Vexler et al.

[11] Patent Number: 5,471,650
[45] Date of Patent: Nov. 28, 1995

[54] RADIO LINK PARAMETER CONTROL IN WIRELESS PERSONAL COMMUNICATIONS SYSTEM

[75] Inventors: Manuel Vexler, Kanata; Victor F. Emerson, Ottawa, both of Canada

[73] Assignee: Northern Telecom Limited, Montreal, Canada

[21] Appl. No.: 104,265

[22] Filed: Jan. 7, 1993

[51] Int. Cl.6 .............................. H04B 1/40; H04B 7/26; G05B 23/02
[52] U.S. Cl. .................... 455/69; 379/63; 340/825.16; 455/88
[58] Field of Search .................... 340/825.06, 825.16; 379/58, 61, 63; 455/68, 69, 70, 88

[56] References Cited

U.S. PATENT DOCUMENTS

| | | | |
|---|---|---|---|
| 4,788,712 | 11/1988 | Umemoto | 379/61 |
| 4,890,332 | 12/1989 | Takahashi . | |
| 4,939,766 | 7/1990 | Umemoto et al. | 379/58 |
| 4,974,251 | 11/1990 | Ohta et al. | 379/61 |
| 5,014,294 | 5/1991 | Kromenaker et al. | 379/58 |
| 5,212,823 | 5/1993 | Fujii et al. . | |
| 5,289,459 | 2/1994 | Brownlie | 455/69 |
| 5,386,589 | 1/1995 | Kanai | 455/88 |

FOREIGN PATENT DOCUMENTS

| | | | |
|---|---|---|---|
| 0305108 | 3/1989 | European Pat. Off. | H04M 1/72 |
| 0464911 | 1/1992 | European Pat. Off. | H04B 17/00 |
| 143057 | 6/1979 | Japan | H04B 7/26 |
| 2178270 | 2/1987 | United Kingdom | H04B 7/26 |
| 2229609 | 9/1990 | United Kingdom | H04B 7/26 |

*Primary Examiner*—Edward F. Urban
*Assistant Examiner*—Mark H. Rinehart
*Attorney, Agent, or Firm*—Yoshiharu Toyooka

[57] ABSTRACT

In personal communications systems, a wireless handset user is not generally aware of the quality of the radio link to the base station when a call is in progress. Novel mechanisms are disclosed by which the handset user is given up-to-date information concerning radio link parameters. According to the invention, the base station continuously analyzes the received signal of a handset and sends back to the handset a signal indicative of the link parameters. Upon receiving the signal, the handset informs the user by way of either processed sidetone or other indications.

7 Claims, 2 Drawing Sheets

RADIO LINK PARAMETER CONTROL IN WIRELESS PERSONAL COMMUNICATIONS SYSTEM

FIELD OF THE INVENTION

The present invention is directed to a wireless personal communications system. More specifically, it is directed to the cordless telecommunication system in which the quality of wireless link parameters is constantly monitored and controlled.

BACKGROUND OF THE INVENTION

In a business application, it is often crucial to ensure that one projects a "professional" or businesslike image. When using a telephone, the telephone manner will influence this image, but the quality of the transmitted voice will also play a role.

On a traditional (wired) business telephone, the speaker's voice is returned to the speaker's ear via sidetone, so that the speaker can be aware of the quality (e.g. loudness) of his or her own voice. With this wireline connection there is typically little, if any, interference on the line that is under the dynamic control of the user, although one may choose to purchase a better quality telephone to project a better image or to abandon a call and try again if the line quality is poor.

When using a handsfree telephone, the transmitted voice often sounds "hollow" or "tinny" to the far end, a result of the increased separation between the mouth of the speaker(s) and the microphone. This "barrel effect" is a frequent source of complaint from users and is also an area where a competitive advantage may be gained by improving transmitted voice quality.

Because wireless devices are typically hand-held (bringing the microphone close to the mouth), the "barrel effect" is not usually a problem. However, as experience with wireless devices increases, evidence is accumulating that transmitted voice quality can be a serious concern in business application, to the extent that one may use a wireless device to receive calls but not to voluntarily initiate calls because the client/customer at the far end will be put off by the poor quality of some connections.

Unlike with a wired telephone, the quality of the low-power radio/wireless link is not fixed on a per-call basis but can be affected by the movements of the user or changing environmental conditions. For example, by walking a few feet or simply turning around the user may significantly alter the quality of the transmitted voice. The quality of the transmitted voice is also affected by interference through the radio link by noise, unwanted signals, or, of course, malfunction, low battery etc. of the handset. Because the user has no means of knowing the effect of these conditions on the transmitted voice, other than by asking the far end, it would be advantageous to provide a mechanism for the user to receive feedback about transmitted voice quality. This mechanism will, in turn, "train" the user to behave in ways which will maximize the "professionalism" of his or her image by improving transmitted voice quality.

In U.S. Pat. No. 5,014,294, issued May 7, 1991 to Kromenaker et al, a unique speakerphone for a cellular telephone is disclosed. The speakerphone of the patent includes means for preventing howl. In addition to the problem of the "barrel effect" mentioned above, the speakerphone also suffers from howling, particularly when used in a confined space such as a car. The howling is caused by acoustic coupling between the microphone and the speaker at the portable terminal because the land link to which the base station is wire-connected contains acoustic feedback and hybrid mismatch feedback elements and completes the loop. In the patent, an A/D converter samples the transmitted and received signals at the portable terminal and a microcomputer operates mute gates on the transmit and receive paths to prevent howling. No signal analysis of the received signal takes place at the base station and no processed signal of the received signal is sent back to the portable terminal to indicate the quality of the radio/wireless link monitored at the base station.

U.S. Pat. No. 4,939,766, issued Jul. 3, 1990 to Umemoto et al, discloses a radio telephone system in which a threshold level of the received signal strength at the handset can be modified arbitrarily. The threshold level is provided to indicate when the received signal strength reaches the minimum level to maintain the quality of radio/wireless link. The indication is done visually or audibly. The received signal is measured at the handset. No indication as to the quality of the radio/wireless link of the signal received at the base station is fed back to the portable terminal.

It should also be noted that visual indication of voice quality (e.g. via green, yellow, and red LEDs) is often impractical in a wireless setting, as it is often impossible to position visual indicators where they can be seen while speaking on a device that has been designed to be small and held against the ear. However, such visual indicators may be useful under certain circumstances and the device can be easily designed to include those features.

OBJECTS OF THE INVENTION

It is an object of the invention to provide a personal communication system in which wireless link parameters measured at the base station are automatically communicated to the handset.

It is another object of the invention to provide a personal communication system in which wireless link parameters measured at the base station are communicated to the handset in digital code.

It is a further object of the invention to provide a personal communication system in which wireless link parameters are constantly measured at the base station and are constantly or periodically communicated to the handset.

SUMMARY OF THE INVENTION

Briefly stated, the present invention is directed to a wireless personal telecommunications system for duplex communication between a portable handset and a base station. According to one aspect of the present invention, the base station comprises analyzing means for analyzing wireless link parameters indicative of the quality of wireless link between the portable handset and base station by monitoring the wireless signal received from the portable handset. The invention further includes processing means for generating an indication signal indicative of the quality of wireless link parameters of the received wireless signal in response to the analyzing means and sending means for sending back to the handset the indication signal.

According to a further aspect of the present invention, the portable handset comprises monitoring means for monitoring an indication signal sent by the base station during duplex communication, the indication signal being indicative of the quality of wireless link between the portable handset and base station. The invention further includes alarm means in response to the monitoring means for indicating the quality of wireless link.

According to a further aspect of the present invention, a method for feeding back to the handset a signal indicative of the quality of wireless link between the base station and portable handset comprises a step of analyzing wireless link parameters indicative of the quality of the wireless link between the portable handset and base station by monitoring at the base station the wireless signal received from the portable handset. The method further includes steps of generating an indication signal indicative of the wireless link parameters of the received wireless signal in response to the analyzing step, and sending back to the handset the indication signal.

BRIEF DESCRIPTION OF THE DRAWINGS

For a more complete understanding of the present invention and for further objects and advantages thereof, reference may now be made to the following description, taken in conjunction with the accompanying drawings, in which.

DETAILED DESCRIPTION OF THE PREFERRED EMBODIMENTS

According to the vehicular cellular systems which are presently in use, a cell radius is about 5 to 10 kilometers (called macrocells), although much smaller cells with a maximum radius of about 500 meters (sometimes called microcells) are used to provide higher capacity in very dense areas. Such a macrocell system requires 10 to 30 watts of power at the base station and 200 to 600 milliwatts at the portable terminal, with car units operating at 3 watts. The push for more spectrum has prompted a yet smaller cell concept (picocells) which permits more effective frequency reuse. The concept of time division multiple access (TDMA) in the advent of digital technology has been introduced. CT2-CAI and CT2Plus standards have been accepted in Europe and Canada and have been gaining support in other parts of the world. The picocellular wireless systems are mainly in-building, low-power wireless applications and provide extremely high capacities with user densities that may range from 20 to 30,000 users per square kilometer. Such systems are characterized by cells that have a radius of about 50 meters and allow only about 10 milliwatts at both the base station and the portable.

Figure 1:
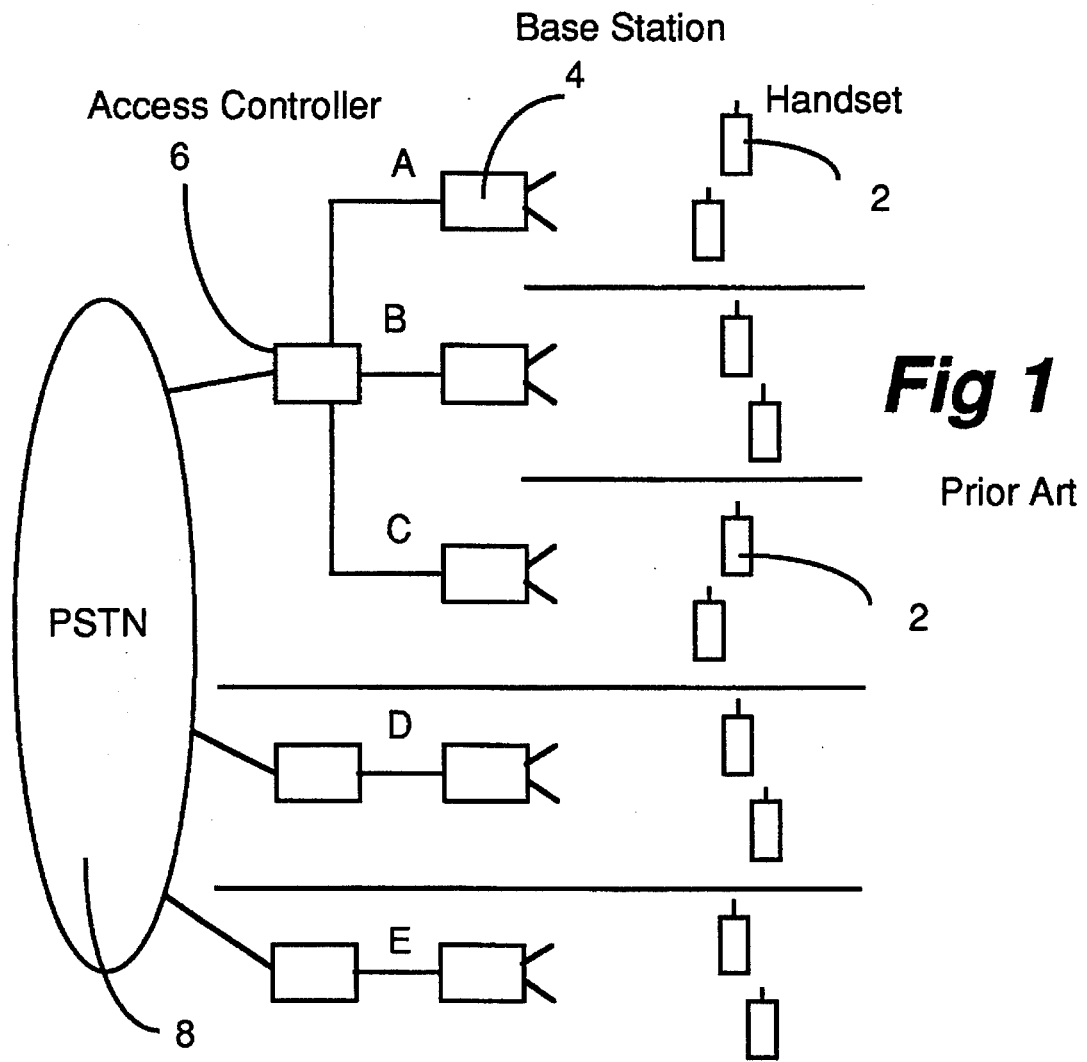
FIG. 1 is a schematic block diagram of cordless communication system.

In the personal wireless system of FIG. 1 (in this example, a picocellular scheme under CT2), users with a portable handset 2 communicate over a wireless link to a base station 4. The base station, in turn, connects via a wireless access controller 6 over digital loops to a public switched telephone network 8. More than one base station can be connected to a wireless access controller. In that case, in addition to the interface function to the wired network, the wireless access controller could handle hand-off among base stations and other management of handset mobility without going through the public switched telephone network.

The base station acts as the medium exchanger between the wireless link and the wire connection. One or more base stations are provided in each cell, each base station handling two or more channels. The transmitter and receiver operate on the same frequency band in a ping-pong, or time division duplex (TDD), fashion—unlike traditional mobile radio operation, in which different frequencies are used for transmission and reception. For example, under CT2 standards, 66 bits of data are transmitted alternately in each direction for every one millisecond timeslot. A spectrally shaped FM method is used for modulation.

Figure 2:
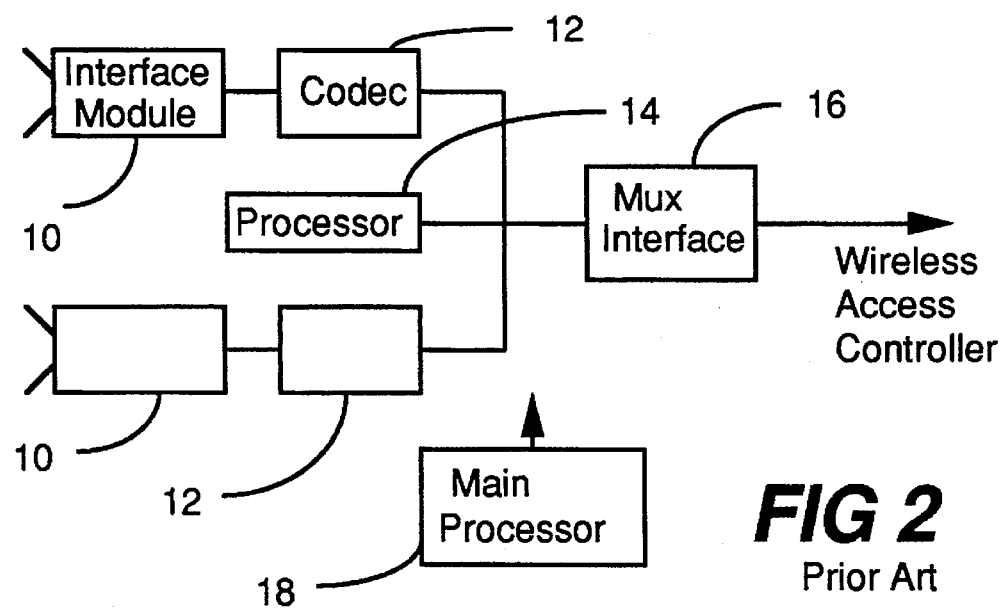
FIG. 2 is a schematic block diagram of a base station.

In this particular embodiment, the base station is shown in FIG. 2 and includes a radio interface module 10 and ADPCM (adaptive differential pulse code modulation) codec 12. There are two radio components, each handling one channel of communication link between the base station and handsets. A D-channel processor 14 takes care of D-channel (signalling channel) signals for call control and other functions. A multiplexing interface 16 facilitates connection to the wireless access controller. A main processor 18 with memory is provided for controlling the proper function of various modules.

Figure 3:
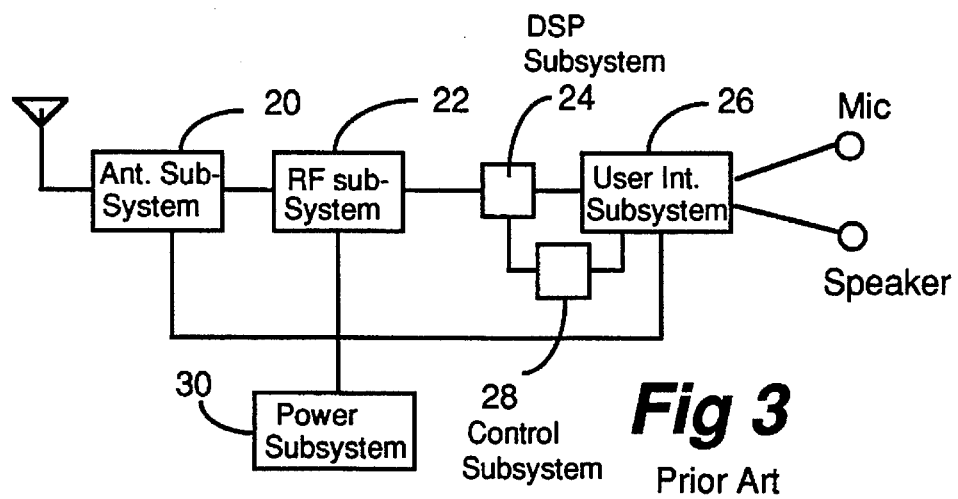
FIG. 3 is a schematic block diagram of a portable handset.

The portable handset is shown in FIG. 3 and comprises six basic subsystems:

- the antenna subsystem 20 which receives messages from and transmits messages to the base station;
- the radio-frequency (RF) subsystem 22 which includes all the analog radio circuits necessary for two-way communications;
- the digital signal processing subsystem 24 which has two major functions: radio control, including management of the CAI protocols, and audio-level signal processing such as speech transcoding, analog-digital conversion, and level adjustments;
- the user-interface subsystem 26 which includes the usual audio transducers, the dial pad and other keys, and the display devices for visual interaction;
- the control subsystem 28 which provides all the intelligence required for implementation of local features such as directories, clocks, and alarms, as well as for communication with the host system; and
- the power subsystem 30 which ensures appropriate power for the entire handset while maximizing battery life.

In a wireless connection, transmitted voice quality is not simply a function of the distance between the speaker's mouth and the microphone. Rather, voice quality will also be affected strongly by the quality of the wireless link (the user has no control of voice quality beyond the wireline link from the base station). Accordingly, provision of sidetone as a feedback to the user necessarily ignores the quality of the radio/wireless link, a major determinant of voice quality.

The present invention therefore uses the actual signal received at the base station. The base station analyses the signal to determine the quality of the radio/wireless link. The base station immediately feeds back to the portable handset an indication signal indicative of the quality of the received signal to the handset. The indication signal can be in the form of digital code or a processed sidetone. Upon receiving the indication signal, the handset sends the processed sidetone to the handset receiver so that the user can hear degraded sidetone which corresponds to the quality of the radio/wireless link as monitored at the base station. If the indication is in digital form, the handset is provided with a decoder whose output is compared with templates stored in the handset. The best match may be communicated to the user by audible or visible indications, e.g. one beep for a weak received signal, or some other indications for other parameters.

Figure 4:
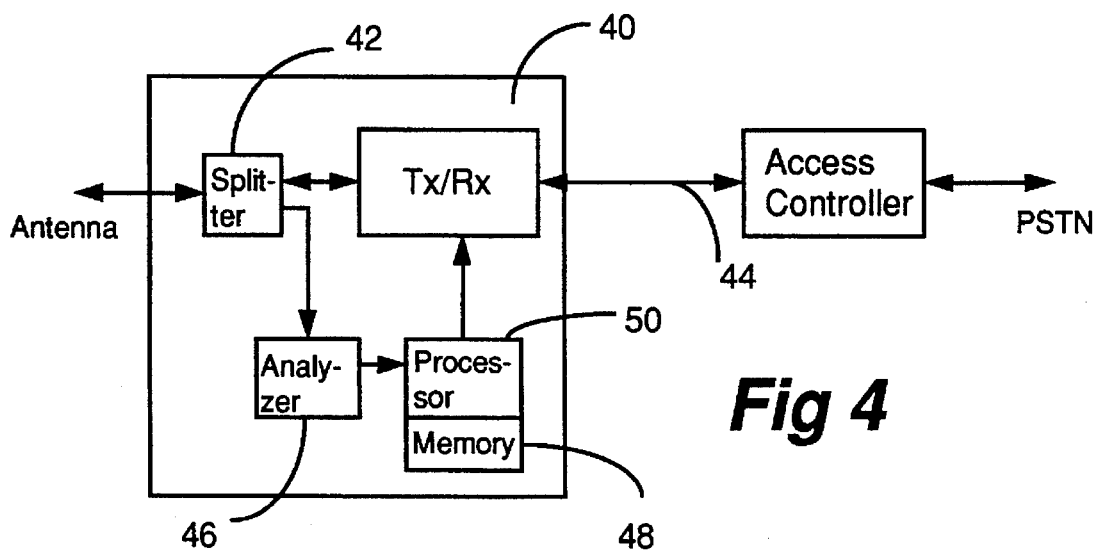
FIG. 4 is a schematic illustration of a base station according to one embodiment of the invention.

According to one embodiment of the present invention, as shown in FIG. 4, the base station 40 splits the received signal into two parts at a splitter 42. One part is transmitted to the far end over the wireline network 44. The other part is sent to an analyzer 46 and after comparison with a reference stored in a memory 48, a processor 50 attenuates or further processes the analyzed signal. The processed signal is superimposed on the voice from the far end and retransmitted to the handset over the same radio channel in the following time slot of the TDD format as the sidetone. This "processed sidetone" could serve as a cue to the transmitted voice quality. When the user hears degraded "processed sidetone", he or she can turn around, move to another location, or otherwise modify his or her behaviour to improve the quality of the radio/wireless link.

Figure 5:
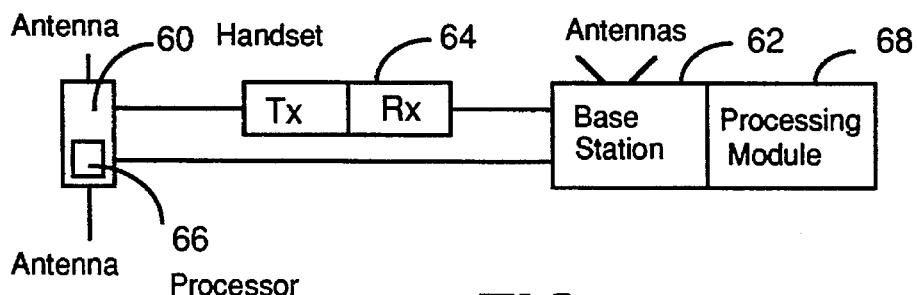
FIG. 5 is a schematic illustration of the system according to another embodiment of the invention.

Now turning to FIG. 5, there is disclosed a personal communication system according to another embodiment of the present invention. In this case, the output of the microphone in the wireless handset 60 is split. One part of the signal is transmitted to the base station 62 over a voice channel 64 symbolically shown as Tx and Rx time slots. The other part is routed to an alarm circuit containing a sidetone processor 66 in the handset. The base station is provisioned with a processing module 68 which analyses the received signal to determine the wireless link parameters, e.g. strength, interference, noise, etc., and matches it against pre-programmed "templates". The templates are stored in the memory at the base station and are representative of a few wireless link parameters indicating the levels or categories of "grade-of-service". The processing module 68 selects the template that best matches the link parameter; each template is represented by a brief "grade-of-service" code which are only a few bits long. This code of a few bits is sent back to the handset either through a signalling channel or through a return voice channel as a superimposed in-band or out-of-band signal, modulated in FSK, PSK or the like. The code received from the base station invokes an appropriate one of a plurality of filters stored at the sidetone processor for processing the voice which has previously been split. The filters at the handset correspond to the templates stored at the base station. This filtered audio signal is fed back to the speaker in the wireless handset as "sidetone". Various degrees of filtering alter the sidetone and indicate the quality of wireless link as monitored at the base station (in effect the quality of the voice transmitted to the far end).

In a further embodiment, the code received from the base station invokes a tone generator which generates a distinguishable audible, visible, or other indicator to indicate a new value of the link quality parameter when the parameter varies a certain predetermined amount. Thus, as an example, one short beep can signify a decreased signal strength and two short beeps may indicate increased noise, etc.

While the TDMA is described thus far, the CDMA (code division multiple access) is, of course, another system which can be used.

It should be noted that, in the case where a non-proprietary handset is used with a base station equipped with a processing module, the sidetone created in the non-proprietary handset (if any) is the sole feedback mechnism available to the user. In the case where a proprietary handset is used with a base station not equipped with a processing module, no "grade-of-service" code signal will be transmitted to the handset, and the handset will create sidetone according to a default value.

We claim:

1. A wireless personal telecommunications system for duplex communication between a portable handset and a base station, which base station comprises analyzing means for analyzing wireless link parameters indicative of the quality of the wireless link between the portable handset and base station by monitoring the wireless signal received from the portable handset and sending means for sending back to the handset an indication of the quality of the wireless link, the invention being characterized in that the base station further includes:

memory means for storing a plurality of templates which are indicative of predefined values of the wireless link parameters of the received wireless signal in response to the analyzing means;

selecting means for selecting, in response to the analyzing means, one of the templates; and generating means for generating as the indication of the quality of the wireless link a digitally encoded signal which indicates said selected one of the templates.

2. The wireless personal telecommunications system for duplex communication between a portable handset and a base station according to claim 1, wherein the digitally encoded signal is sent to the portable handset through a signaling channel contained in the wireless link between the base station and portable handset.

3. The wireless personal telecommunications system for duplex communication between a portable handset and a base station according to claim 2, wherein the digitally encoded signal is sent to the handset as an in-band or out-of-band signal through a data channel contained in the wireless link between the base station and portable handset.

4. The wireless personal telecommunications system for duplex communication between a portable handset and a base station according to claim 1, wherein the portable handset further includes:

memory means for storing a plurality of templates which are indicative of predefined values of the wireless link parameters of the received wireless signal;

selecting means for selecting, in response to the digitally encoded signal, one of the templates; and generating means for generating a pre-programmed alarm to indicate the selected one of the templates.

5. The wireless personal telecommunications system for duplex communication between a portable handset and a base station according to claim 4, wherein the generating means is a sidetone processor which generates the sidetone indicative of the quality of wireless link according to one of a plurality of pre-programmed sidetone levels in response to the selected one of the templates.

6. In a wireless personal telecommunications system for duplex communication between a portable handset and a base station, which base station comprises analyzing means for analyzing wireless link parameters indicative of the quality of the wireless link between the portable handset and base station by monitoring the wireless signal received from the portable handset and sending means for sending back to the handset an indication of the quality of the wireless link; the invention being characterized in that a method for feeding back to the handset a signal indicative of the quality of wireless link between the base station and portable handset comprises steps of:

the base station selecting, in response to the analyzing means, one of a plurality of stored templates indicative of the predefined quality of the wireless link; and sending to the portable handset a digitally encoded signal which indicates the selected one of the templates;

the portable handset selecting, in response to the digitally encoded signal, one of the templates which are stored in the handset and generating one of a plurality of preprogrammed sidetones indicative of the wireless link parameters of said received wireless signal in response to the selected one of the templates.

7. The method for feeding back to the handset a signal indicative of the quality of wireless link between the base station and portable handset in a wireless personal telecommunications system for duplex communication according to claim 6, wherein the step of the base station sending the digitally encoded signal is carried out in-band or out-band.

* * * * *